United States Patent Office 2,804,757
Patented Sept. 3, 1957

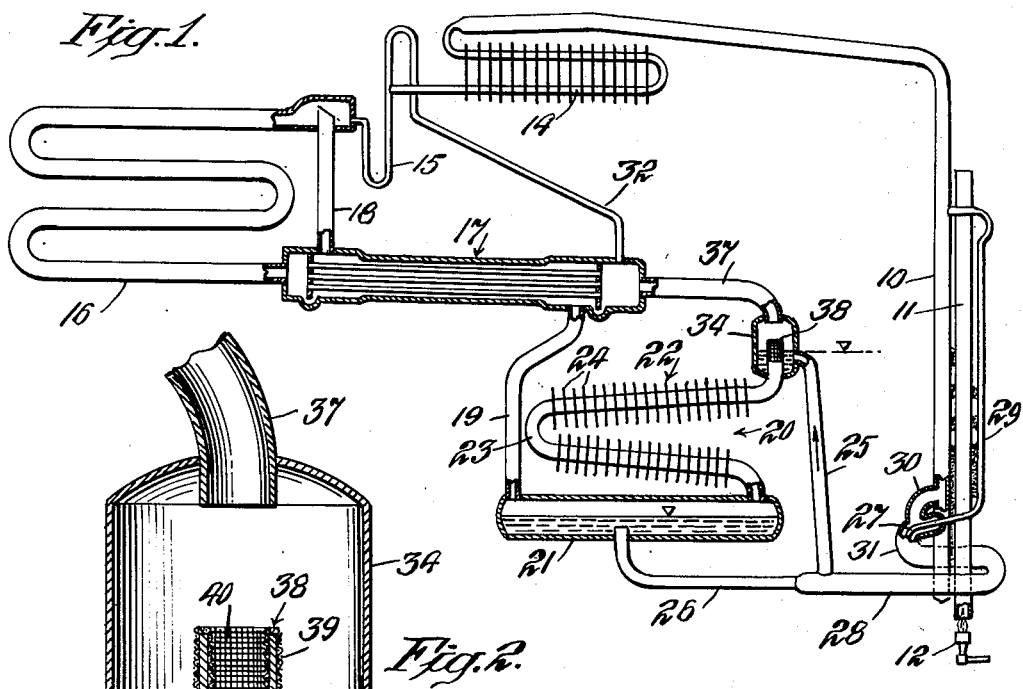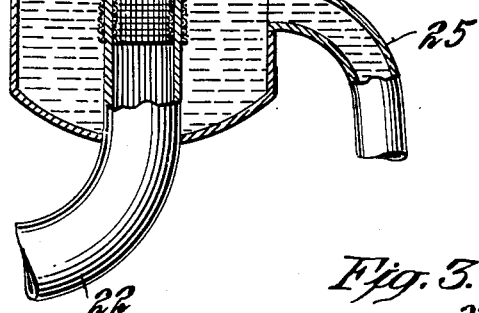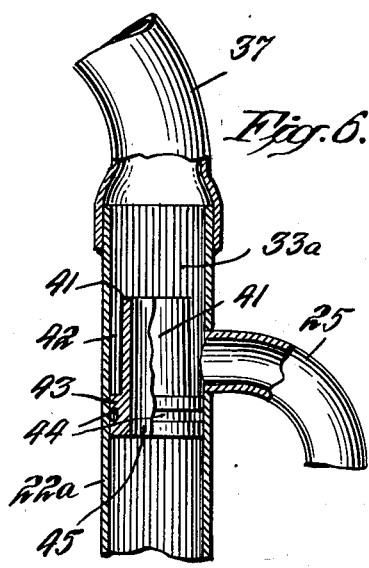

2,804,757
ABSORPTION REFRIGERATION

Hugo Malcolm Ullstrand and Axel Gosta Hellstrom, Stockholm, Sweden, assignors to Aktiebolaget Elektrolux, Stockholm, Sweden, a corporation of Sweden Application May 22, 1951, Serial No. 227,568

Claims priority, application Sweden May 26, 1950

17 Claims. (Cl. 62—119.5)

Our invention relates to refrigeration systems of the absorption type and is particularly concerned with the surface contact effected between a gas and a liquid in such systems.

In heat transfer parts of absorption refrigeration systems in which a liquid flows in the presence of a gas, such as in cooling elements or evaporators and absorbers thereof, a wall area is provided at which surface contact between the gas and liquid may be effected. In such parts provision is usually made to effect flow of the liquid in a manner to cause it to come in contact with as much of the wall area as possible.

The object of our invention is to provide an improvement in heat transfer parts of the kind referred to above in which surface contact between a gas and a liquid may be effected over a maximum area of a wall of a heat transfer part. We accomplish this by providing a heat transfer part in which the side of a wall thereof contacted by a liquid is formed with a capillary liquid surface having capillary flow paths extending in the direction of liquid flow. In the preferred embodiment of the invention the inside wall of piping is formed with longitudinal capillary grooves, such grooves being spaced apart so as to effect complete wetting of the piping by a liquid film which is distributed about the entire inner peripheral surface thereof and extends in the direction of liquid flow. Further, a liquid distributor is advantageously employed at the liquid inlet end of the heat transfer part to facilitate and promote flow of liquid into all of the longitudinal capillary grooves.

Further objects and advantages of our invention will become apparent from the following description and accompanying drawing, and the features of novelty which characterize our invention are pointed out with particularity in the claims which form a part of this specification.

In the drawing,

Fig. 1 is a view more or less diagrammatically illustrating an absorption refrigeration system of the inert gas type embodying the invention;

Fig. 2 is an enlarged fragmentary vertical sectional view of a part of the absorber shown in Fig. 1 to illustrate details more clearly;

Fig. 3 is an enlarged cross-sectional view of the absorber piping shown in Fig. 1 to show more clearly the manner in which the interior is formed;

Figs. 4 and 5 are fragmentary cross-sectional views of absorber piping illustrating other forms of the invention; and Fig. 6 is a fragmentary vertical sectional view similar to Fig. 2 illustrating a modification of the invention.

In Fig. 1 we have shown our invention in connection with an absorption refrigeration system of a uniform pressure type which is well known in the art and in which an inert pressure equalizing gas is employed. Such a refrigeration system comprises a generator or boiler 10 containing a refrigerant, such as ammonia, in solution in a body of absorption liquid, such as water. Heat may be supplied to the boiler 10 from a heating tube or flue 11 thermally connected therewith, as by welding. The heating tube 11 may be heated in any suitable manner, as by an electrical heating element positioned therein or by a liquid or gaseous fuel burner 12, for example, which is adapted to project its flame into the lower end of the tube.

The heat supplied to the boiler 10 and its contents expels refrigerant vapor out of solution, and the vapor thus generated flows to an air cooled condenser 14 in which it is condensed and liquefied. Liquid refrigerant flows from condenser 14 through a conduit 15 into a cooling element 16 in which it evaporates and diffuses into an inert pressure equalizing gas, such as hydrogen, which enters the lower part thereof from a gas heat exchanger 17. Due to evaporation of refrigerant fluid into inert gas, a refrigerating effect is produced with consequent absorption of heat from the surroundings.

The rich gas mixture of refrigerant vapor and inert gas formed in cooling element 16 flows from the upper part thereof through a conduit 18, gas heat exchanger 17, conduit 19 and absorber 20 comprising a vessel 21 and a coil 22 formed of piping 23 which is provided with a plurality of heat dissipating elements or fins 24. In the absorber coil 22 the rich gas mixture flows countercurrent to downwardly flowing absorption liquid which enters through a conduit 25. The absorption liquid absorbs refrigerant vapor from inert gas, and inert gas weak in refrigerant flows from the upper part of the absorber coil in a path of flow including the gas heat exchanger 17 into the lower part of cooling element 16.

Absorption solution flows downwardly through coil 22 into the absorber vessel 21 and such solution, which is enriched in refrigerant, passes from the vessel through a conduit 26 and an inner passage or pipe 27 of liquid heat exchanger 28 into the lower end of a vapor lift pipe or tube 29 which is in thermal exchange relation with the heating tube 11, as by welding. Liquid is raised by vapor-liquid lift action through pipe 29 into the upper part of boiler 10. Refrigerant vapor expelled out of solution in boiler 10, together with refrigerant vapor entering through pipe 29, flows upwardly from the boiler to the condenser 14, as previously explained. The absorption liquid from which refrigerant vapor has been expelled flows from the boiler 10 through a connection 30, an outer pipe or passage 31 of the liquid heat exchanger 28 and conduit 25 into the upper part of the absorber coil 22 in a manner to be explained presently. The circulation of absorption solution in the liquid circuit just described is effected by raising of liquid through pipe 29.

The outlet end of the condenser 14 is connected by an upper extension of conduit 15 and a conduit 32 to a part of the gas circuit, as to the gas heat exchanger 17, for example, so that any inert gas which may pass through the condenser 14 can flow into the gas circuit. The circulation of gas in the gas circuit is due to the difference in specific weight of the columns of gas rich and weak, respectively, in refrigerant vapor. Since the column of gas rich in refrigerant vapor and flowing from cooling element 16 to the absorber coil 22 is heavier than the gas weak in refrigerant and flowing from the absorber coil to cooling element 16, a force is produced or developed within the system for causing circulation of inert gas in the manner described.

In accordance with our invention surface contact between a gas and a liquid is effected in the absorber coil 22 over a maximum area of the inside wall of the piping 23 forming such coil. Such maximum surface contact is obtained in the absorber coil 22 of Fig. 1 by employing piping 23 having longitudinally extending grooves 33 of the form shown in Fig. 3. The grooves 33 are formed in the absorber coil 22 along the entire length thereof from the extreme upper end of the coil, which projects upwardly in a vessel 34, to the extreme lower end thereof at the region of its connection to vessel 21. Hence, the grooves 33 are located not only along the horizontally extending straight sections of the absorber coil but also at the connecting bends at the ends of such straight sections and provide a capillary liquid surface forming an integral part of the piping 23.

In the embodiment being described and shown most clearly in Fig. 3, the grooves 33 are square-shaped and of such size that liquid flows downwardly in all of the grooves including the grooves in the ceiling and side walls of the piping 23 in which the downwardly flowing liquid is held by capillary forces. Hence, by providing grooves 33 of capillary dimensions and keeping the grooves closely spaced from one another, it has been found that a thin liquid film can be produced about the entire inner surface of the tubing 23 which extends along the entire length of the absorber coil 22 when liquid is introduced into the upper end thereof about the entire inner peripheral surface. The grooves 33 provide a multiplicity of capillary passages which are disposed alongside one another and extend coextensively within the piping 23 from the upper liquid inlet end thereof. Each groove 33 provides a capillary passage in which liquid advances predominantly in the lengthwise direction of the piping 23 at all peripheral regions of the interior thereof during flow of liquid lengthwise of the piping.

By distributing liquid about the entire inner peripheral surface of the piping 23 and maintaining such liquid in the form of a film along the entire length of the absorber coil 22, a maximum contact surface is provided at the inside wall of the piping between such liquid and inert gas flowing upwardly through the absorber coil. Refrigerant vapor is absorbed out of the gas mixture entering the lower end of coil 22 into the downwardly flowing liquid film formed in the interior of the coil. Such downwardly flowing liquid film becomes heated due to absorption of refrigerant vapor, and such heat of absorption is conducted outwardly through the walls of the tubing 23 and given up to surrounding cooler air which passes over and in intimate contact with the exterior wall of the tubing. In the embodiment shown, the heat dissipating elements or fins 24 are provided to facilitate and promote transfer of heat of absorption from the liquid film at the interior of the tubing to the surrounding cooling medium which passes in thermal transfer relation with the absorber coil 22 and fins 24 fixed thereto.

The grooves 33 not only provide the maximum gas and liquid contact surface area that can be maintained within piping 23 but also increase the actual internal surface area which is contacted by the liquid when compared with conventional tubing and piping having relatively smooth internal walls. The longitudinally extending grooves extend coextensively from the liquid inlet end and are essentially straight in that each individual groove more or less remains in the same vertical plane throughout the length of the absorber coil when the latter is disposed and positioned substantially in a vertical plane. Hence, throughout each straight coil section the capillary grooves 33 at the ceiling and side walls of the piping 23 always remain at the ceiling and side walls, respectively. However, the capillary grooves 33 at the ceiling of the upper straight coil section become the grooves at the bottom of the lower straight coil section while the grooves at the bottom of the upper straight coil section become the grooves at the ceiling of the lower straight coil section. While each individual groove may deviate from a vertical plane along the length thereof, any additional benefit over and beyond that already described is not realized because the liquid is introduced into and distributed among the several grooves at their extreme upper ends and such distribution will result in complete wetting of the entire inner peripheral surface of the coil 22 to give maximum gas and liquid contact surface area.

The grooves formed at the inner wall surface of the piping may assume a variety of forms, the only requirement being that liquid flowing downwardly in the grooves at the ceiling and side wall portions of the tubing will remain in such grooves by capillary forces. By way of example, V-shaped grooves 35 may be employed as shown in Fig. 4 and U-shaped grooves 36 may be employed as seen in Fig. 5. The square-shaped grooves 33 and U-shaped grooves 36 possess a slight advantage over the V-shaped grooves 35 in that a greater over-all heat transfer surface at the inner wall of piping is obtained with grooves 33 and 36 when the depth of the grooves is substantially the same.

One manner of effecting distribution of liquid at the upper end of absorber coil 22 is illustrated in Figs. 1 and 2 in which the upper open end of the absorber coil 22 terminates above the liquid level maintained in vessel 34 into the lower part of which absorption liquid weak in refrigerant is introduced through the conduit 25. Inert gas weak in refrigerant passes from the upper end of coil 22 through vessel 34 and a conduit 37 which is connected to the gas heat exchanger 17. A suitable wick 38 is provided at the extreme upper end of the coil 22 for drawing liquid upwardly in vessel 34 by capillary action at the outer surface of piping 23. Such wick may be formed of metal screening having one portion 39 extending downwardly at the outer surface of the upper coil end and another portion 40 which extends downwardly into the interior of the piping and overlies the upper ends of the grooves 33 and snugly fits against the inner peripheral wall surface of the tubing. In this way liquid will be evenly distributed between all of the grooves 33 at the upper or liquid inlet ends thereof to provide complete wetting of the entire peripheral surface of the absorber coil 22 throughout its entire length.

Another form of liquid distributor is shown in Fig. 6 in which the extreme upper end of an absorber coil 22a is connected directly to the conduit 37 for conducting weak inert gas back to the cooling element 16, and the conduit 25 for introducing absorption liquid to the absorber coil 22a is connected to the upper vertically disposed end portion thereof. Within the upper coil end is provided a hollow tubular element or sleeve 41 whose outer diameter is less than the internal diameter of the coil 22a to provide an annular chamber or space 42 therebetween into which absorption liquid passes through conduit 25.

The lower part of the tubular element 41 is formed with an enlarged portion 43 which snugly fits against the inner peripheral wall surface of the coil 22a and overlies the longitudinally extending grooves 33a formed therein which may be like the grooves 33 in Fig. 3 or the grooves 35 and 36 shown in Figs. 4 and 5, respectively. With such arrangement the only spaces through which liquid can pass into coil 22a beneath the tubular element 41 are those formed by the longitudinally extending grooves. Since the tubular element 41 can be positioned in coil 22a to maintain a liquid column in the cylindrical-shaped passage 42, the hydrostatic pressure of such liquid column at the top surface of the enlarged portion 43 of the element 41 will be effective to cause uniform distribution of liquid between all of the longitudinally extending grooves 33a. In practice, it has been found that the capillary grooves 33a are so narrow that an extremely small pressure difference or build-up is necessary to cause liquid to pass from the space 42 into the capillary passage regions between the inner surface of the absorber piping and the enlarged portion 43 of the tubular element 41.

Since the rate at which liquid is lifted in tube 29 by vapor lift action can be determined for a given set of conditions, the liquid distributor of Fig. 6 can also be dimensioned to allow liquid to pass therefrom into coil 22a at a rate which approximates the rate at which liquid is lifted in tube 29. In addition, the enlarged portion 43 of the element 41 may be formed with a horizontally disposed capillary groove 44 of annular form at the outer peripheral surface thereof to facilitate and promote distribution of liquid between all of the grooves 33a at a region below the top surface of the enlarged portion 43 in the event a groove accidentally should become clogged by foreign matter at the vicinity of such top surface. By employing the hollow tubular element 41 to effect liquid distribution in the manner just described, the hollow interior 45 therein provides a passage through which inert gas can readily pass upwardly from the absorber coil to the cooling element of the gas circuit.

In accord with our invention a maximum gas and liquid contact surface area can be obtained within tubing or piping in any heat transfer part of the refrigeration system where such gas and liquid contact surfaces are necessary in the normal functioning of the system. Accordingly, the advantages and benefits of the invention may be realized in a cooling element or evaporator of the refrigeration system, such as the cooling element 16, for example. In such case a liquid distributor of the kind shown in Figs. 2 or 6 and described above may be connected to receive liquid refrigerant from conduit 15 and the tubing forming the cooling element may be like that shown in Figs. 3, 4 or 5, for example. By providing a cooling element or evaporator of such construction a maximum gas and liquid contact surface area will be obtained between the film of liquid refrigerant formed completely about the interior surface of the evaporator piping and the inert gas flowing therethrough, thereby promoting and facilitating evaporation and diffusion of refrigerant fluid into inert gas.

In view of the foregoing, it will now be understood that complete internal wetting of piping can be effected in parts of a refrigeration system like the absorber coil 22, for example, by distribution of liquid at the upper end of the coil and the provision of capillary size grooves extending lengthwise of the piping which are closely adjacent to one another. The inclination of the straight sections of the coil must be given consideration so that the surface forces between the liquid film and surfaces to which such liquid adheres are properly utilized to insure the maintenance of the liquid film and movement thereof within the interior of the piping. Accordingly, the inclination of the piping desirably should be such that the surface forces between the liquid and downwardly inclined piping at the ceiling and interior side walls thereof are such that the liquid tends to adhere to the surfaces. Further, such surface forces, together with the force of gravity, desirably should be capable of effectively moving liquid in the capillary grooves and adhering thereto, the liquid in the absorber coil 22 about the entire inner surface of the piping, including the ceiling and side walls thereof moving at a relatively slow rate.

In view of the fact that a maximum gas and liquid contact surface area can be made available in piping in accord with our invention, the size and weight of refrigeration parts like the absorber coil 22, for example, can be appreciably reduced. Since the absorption capacity of an absorber like the absorber 20 is extremely high per unit length of the absorber coil 22, the length of absorber piping embodying the principles of our invention will be considerably shorter than in an absorber embodying conventional tubing. In addition to the saving and economy effected in material by reason of the fact that the length of the absorber coil can be substantially reduced in accord with our invention, another advantage realized is that a higher temperature differential can be maintained between the inner and outer wall surfaces of the absorber piping than heretofore possible, thereby facilitating transfer of heat through the wall of the piping and dissipation thereof to the cooling medium flowing in intimate contact with the outer wall surface.

When an absorber embodying the invention is employed in an air-cooled refrigeration system, such an absorber occupies a minimum amount of space which contributes to providing a refrigerator of a given size having minimum exterior dimensions. Further, since an absorber in accord with the invention requires less piping, such an absorber is substantially smaller and not as massive which results in greater space about the absorber for flow of air past the absorber in thermal transfer relation therewith.

While an absorber has been described and illustrated which embodies a single coil 22, it should be understood that a number of such coils may be employed in which the upper ends are disposed in the vessel 34 in Fig. 2 alongside one another, or in which the upper end of the conduit 25 in Fig. 6 is provided with a plurality of branches for supplying liquid to the upper ends of a number of coils like the coil 22a.

Modifications of the embodiments of our invention which we have described will occur to those skilled in the art, so that we desire our invention not to be limited to the particular arrangements set forth and intend in the claims to cover all modifications which do not depart from the spirit and scope of the invention.

What is claimed is:

1. In absorption refrigeration apparatus having an inert gas circuit, a heat transfer member in such gas circuit comprising piping having a vertically extending inlet for liquid, said piping having a multiplicity of internal longitudinal capillary grooves which are disposed alongside one another, each groove providing a capillary passage in which liquid advances lengthwise thereof during flow of liquid lengthwise of the piping in the presence of the gas, and means to conduct liquid to the vertically extending inlet of said piping, said last-mentioned means including a member which overspreads all of the longitudinally extending grooves at the inlet of said piping to distribute a part of the liquid to each individual groove.

2. Apparatus as set forth in claim 1 in which said liquid conducting means includes an element disposed within said piping, a first portion of said element forming said member which engages the inner surface of the piping about the entire periphery thereof and another portion thereof extending upwardly within the piping and cooperating therewith to form a passage of annular form, said passage having liquid conducted thereto, and the first portion of said element distributing a part of the liquid in said space to each individual groove.

3. Apparatus as set forth in claim 2 in which the first portion of said element is formed with a capillary groove of annular form at the outer peripheral surface thereof which is transverse to the longitudinal grooves in said piping.

4. In absorption refrigeration apparatus having an inert gas circuit, a heat transfer member in such gas circuit comprising piping having an inlet for liquid, said piping having a multiplicity of capillary grooves distributed about the interior thereof which are disposed alongside one another and extend coextensively within the piping from the liquid inlet end thereof, each groove providing a capillary passage in which liquid advances lengthwise thereof during flow of liquid lengthwise of the piping in the presence of a gas, means providing a place for maintaining a body of liquid, and means for flowing liquid only in a downwardly descending path of flow from said place to all of said capillary grooves at the liquid inlet end of said piping.

5. In absorption refrigeration apparatus having an inert gas circuit, a heat transfer member in such gas circuit comprising piping having a vertically extending inlet for liquid, said piping being inclined at an acute angle to the horizontal and having a multiplicity of internal longitudinal capillary grooves which are disposed alongside one another, each groove providing a capillary passage in which liquid advances lengthwise thereof during flow of liquid lengthwise of the piping in the presence of the gas, means providing a place for maintaining a body of liquid, and means to conduct liquid only in a downwardly descending path of flow from said place to the vertically extending inlet of said piping and distribute a part of the liquid to each individual groove.

6. In absorption refrigeration apparatus, a conduit which is inclined to the horizontal, the wall of said conduit having a multiplicity of capillary grooves distributed about the interior thereof which are disposed alongside one another and extend substantially parallel to the axis of said conduit from the upper end thereof, means for supplying liquid absorbent to all of the grooves at the upper end of said conduit, said capillary grooves being spaced apart such a distance and of such size that substantially complete wetting of said conduit about the entire inner surface thereof is effected by liquid flowing therein, and said grooves utilizing the combined forces of capillarity and gravity to cause a continuous flow of liquid along the grooves longitudinally of the inclined conduit.

7. In absorption refrigeration apparatus having an inert gas circuit comprising a part in which liquid flows by gravity in the presence of gas, said part including a conduit inclined at an acute angle to the horizontal, the wall of said conduit having a multiplicity of internal capillary grooves which are disposed alongside one another and extend coextensively within said conduit from the upper end thereof, means for supplying liquid absorbent to all of the grooves at the upper end of said conduit, said grooves providing a multiplicity of flow paths and extending lengthwise of said conduit both at the bottom and ceiling thereof and in each of which liquid only flows downwardly as it advances in a lengthwise direction of said conduit, and said grooves utilizing the combined forces of capillarity and gravity to cause a continuous flow of liquid along the grooves longitudinally of the inclined conduit.

8. Apparatus as set forth in claim 7 in which said grooves have spaced apart parallel side walls and a bottom wall transverse to the side walls.

9. Apparatus as set forth in claim 7 in which said grooves are U-shaped.

10. Apparatus as set forth in claim 7 in which said grooves are V-shaped.

11. In absorption refrigeration apparatus having an inert gas circuit comprising a plurality of parts in which liquid flows by gravity in the presence of gas, one of said parts comprising a looped coil having an inlet and outlet for liquid at different elevations which is formed of piping including sections inclined at an acute angle to the horizontal and a connecting bend, the wall of said piping having internal capillary grooves which are disposed alongside one another and extend continuously within said piping from the liquid inlet end thereof through the inclined sections and connecting bend of said pipe, means for supplying liquid to all of said grooves at the inlet end of said piping, said grooves providing a multiplicity of flow paths and extending lengthwise of said inclined sections both at the bottoms and ceilings thereof and in each of which liquid only flows downward as it advances in the lengthwise direction of said piping, and said grooves utilizing the combined forces of capillarity and gravity to cause a continuous flow of liquid along the grooves longitudinally of the inclined sections and connecting bend.

12. In absorption refrigeration apparatus having an inert gas circuit comprising a plurality of parts in which liquid flows by gravity in the presence of a gas, one of said parts comprising a looped coil which is formed of piping including horizontally extending straight sections and a connecting bend, said coil having an inlet for liquid at the upper end which extends vertically upward and an outlet for liquid at the lower end, said piping having internal longitudinal capillary grooves which extend continuously through the straight sections and connecting bend thereof, said grooves having portions extending lengthwise of said straight sections at the bottoms and ceilings thereof and in each of which liquid advances lengthwise of said piping, the portion of said piping forming said upper coil end also having internal longitudinal capillary grooves which communicate with the grooves in said straight sections and connecting bend, and means to conduct liquid to the upper end of said looped coil, said last mentioned means including a member which overspreads all of said longitudinally extending grooves at the upper end of said coil to distribute a part of said liquid to each individual groove.

13. In absorption refrigeration apparatus having an inert gas circuit, a heat transfer member in such gas circuit comprising piping having an upright liquid receiving end, said piping being inclined at an acute angle to the horizontal to provide a predetermined slope and having a multiplicity of internal longitudinal capillary grooves which are disposed alongside one another, each groove providing a capillary passage in which liquid advances lengthwise of the piping in the presence of the gas, and means to conduct liquid to said grooves, said last-mentioned means including structure within the upright end of said piping which spreads over and cooperates with the longitudinal grooves at such liquid receiving end to distribute a part of the liquid to each groove.

14. In an absorption refrigeration system, a heat or material transfer device for a liquid absorbent comprising means forming a path of flow for the liquid having a wall inclined at an acute angle to the horizontal to provide a predetermined slope, said wall having capillary grooves in its surface extending lengthwise of the path of flow and along each of which liquid flows only in a downwardly direction, means for supplying liquid to the grooves at the upper end of said wall, and said grooves utilizing the combined forces of capillarity and gravity to cause liquid to continuously flow along the grooves lengthwise of the path of flow.

15. In an absorption refrigeration system, a heat or material transfer device for liquid absorbent comprising a tube inclined at an acute angle to the horizontal, the wall of said tube having a plurality of separate capillary grooves therein arranged in spaced parallel relation over its surface and extending longitudinally of the tube and along each of which liquid flows only in a downwardly direction, means for supplying liquid to all of the grooves at the upper end of said tube, and said grooves utilizing the combined force of capillarity and gravity to cause a continuous flow of liquid along the grooves longitudinally of the inclined tube.

16. In an absorption refrigeration system, a heat or material transfer device for a liquid absorbent comprising means forming a path of flow for the liquid having a wall inclined at an acute angle to the horizontal to provide a predetermined slope, said wall having capillary grooves in its surface which extend substantially parallel to its slope, and lengthwise of the path of flow, means for supplying liquid to said grooves at the upper end of said wall, and said grooves utilizing the combined forces of capillarity and gravity to cause liquid to continuously flow along the grooves lengthwise of the path of flow.

17. In an absorption refrigeration system, a heat or material transfer device for liquid absorbent comprising a tube inclined at an acute angle to the horizontal, the wall of said tube having a plurality of separate capillary grooves therein arranged in spaced parallel relation over its surface and extending substantially parallel to the axis of the tube, means for supplying liquid to all of the grooves at the upper end of said tube, and said grooves utilizing the combined force of capillarity and gravity to cause a continuous flow of liquid along the grooves longitudinally of the inclined tube.

References Cited in the file of this patent

UNITED STATES PATENTS

| | | |
|---|---|---|
| 2,118,943 | Price | May 31, 1938 |
| 2,279,548 | Bailey | Apr. 14, 1942 |
| 2,307,947 | Payne | Jan. 12, 1943 |
| 2,350,347 | Gaugler | June 6, 1944 |
| 2,426,044 | O'Brien | Aug. 19, 1947 |
| 2,517,654 | Gaugler | Aug. 8, 1950 |
| 2,583,769 | Gaugler | Jan. 29, 1952 |
| 2,691,281 | Phillips | Oct. 12, 1954 |

FOREIGN PATENTS

| | | |
|---|---|---|
| 520,953 | Great Britain | May 8, 1940 |